United States Patent
Gorajski et al.

(10) Patent No.: US 9,897,140 B2
(45) Date of Patent: Feb. 20, 2018

(54) HYBRID DUPLEX BALL BEARING ASSEMBLY

(71) Applicant: UNITED TECHNOLOGIES CORPORATION, Farmington, CT (US)

(72) Inventors: Matthew Gorajski, San Diego, CA (US); Behzad Hagshenas, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 112 days.

(21) Appl. No.: 14/764,308

(22) PCT Filed: Jan. 31, 2014

(86) PCT No.: PCT/US2014/014061
§ 371 (c)(1),
(2) Date: Jul. 29, 2015

(87) PCT Pub. No.: WO2014/123772
PCT Pub. Date: Aug. 14, 2014

(65) Prior Publication Data
US 2015/0362013 A1   Dec. 17, 2015

Related U.S. Application Data

(60) Provisional application No. 61/761,530, filed on Feb. 6, 2013.

(51) Int. Cl.
*F16C 25/08* (2006.01)
*F02C 7/06* (2006.01)
(Continued)

(52) U.S. Cl.
CPC ............ *F16C 25/083* (2013.01); *F01D 25/16* (2013.01); *F02C 7/06* (2013.01); *F16C 19/183* (2013.01);
(Continued)

(58) Field of Classification Search
CPC .... F16C 19/183; F16C 19/188; F16C 19/545; F16C 19/56; F16C 25/083; F16C 27/066;
(Continued)

(56) References Cited

U.S. PATENT DOCUMENTS 3,909,085 A    9/1975  Wilkinson et al.
4,329,000 A    5/1982  Keske
(Continued)

FOREIGN PATENT DOCUMENTS

DE            952045 C  * 11/1956   ............ F16C 19/183
DE    102010032111 A1 *  1/2012   ............ F16C 19/183
(Continued)

OTHER PUBLICATIONS

English Translation to DE102010032111 Abstract.
(Continued)

*Primary Examiner* — Phillip A Johnson
(74) *Attorney, Agent, or Firm* — Cantor Colburn LLP

(57) ABSTRACT

According to one aspect of the present invention, a preloaded hybrid duplex bearing assembly is disclosed. A hybrid duplex ball bearing assembly includes a forward bearing, an aft bearing, and a preload spring, the preload spring disposed adjacent the aft bearing and configured to apply an axial force to push the aft bearing toward the forward bearing, where the forward bearing and aft bearing share an inner race. The forward bearing and the aft bearing are angular contact bearings each including a contact angle, and the contact angles of the forward bearing and the aft bearing converge at a point within the bearing assembly. In
(Continued)

one embodiment, the aft bearing is not radially loaded and carries only the axial force of the preload spring. In at least one embodiment, the forward bearing forms a radial clearance fit with the aft bearing such that the aft bearing carries no radial load.

20 Claims, 2 Drawing Sheets

(51) Int. Cl.
*F16C 19/18* (2006.01)
*F16C 19/50* (2006.01)
*F01D 25/16* (2006.01)
*F16C 33/66* (2006.01)

(52) U.S. Cl.
CPC ........ *F16C 19/505* (2013.01); *F16C 33/6677* (2013.01); *F16C 2360/23* (2013.01); *Y02T 50/671* (2013.01)

(58) Field of Classification Search
CPC .. F16C 33/60; F16C 33/6651; F16C 33/6677; F16C 33/6681; F16C 33/6685; F01D 25/16

See application file for complete search history.

(56) References Cited

U.S. PATENT DOCUMENTS

| 5,316,393 | A | 5/1994 | Daugherty |
| 6,048,101 | A | 4/2000 | Rasmunssen |
| 7,604,414 | B2 | 10/2009 | Verhoeven |
| 7,918,608 | B2 * | 4/2011 | Braun ................... F16C 19/54 384/500 |
| 2006/0153483 | A1 | 7/2006 | Bridges et al. |

FOREIGN PATENT DOCUMENTS

| FR | 2243366 A1 | 4/1975 | |
| JP | 2005172099 A * | 6/2005 | ............ F16C 19/183 |
| WO | 8200865 A1 | 3/1982 | |

OTHER PUBLICATIONS

European Search Report for Application No. 14748984.3; dated May 27, 2016.
Written Opinion for International Application No. PCT/US2014/014061 dated May 20, 2014.
PCT/US2014/014061 International Searching Authority, International Search Report, dated May 20, 2014.

* cited by examiner

# HYBRID DUPLEX BALL BEARING ASSEMBLY

CROSS REFERENCE TO RELATED APPLICATIONS

The present application is related to, and claims the priority benefit of, International Patent Application No. PCT/US2014/014061, filed Jan. 31, 2014, and U.S. Provisional Patent Application Ser. No. 61/761,530 filed Feb. 6, 2013, the contents of which are hereby incorporated in their entirety into the present disclosure.

TECHNICAL FIELD OF THE DISCLOSED EMBODIMENTS

The present disclosure is generally related to gas turbine engines and, more specifically, a hybrid duplex ball bearing assembly.

BACKGROUND

The ball bearing assemblies used to support the main rotors of high speed gas turbine engines are generally designed to accept both radial and axial loads from the main rotor shaft. Given the extreme operating conditions of such engines, the bearing assemblies must be specifically capable of withstanding high thrust loads while minimizing mass. A turbine engine will produce a large amount of thrust at low altitudes due to the relatively high pressure of the air. As the aircraft climbs in altitude, the thrust produced by the engine will drop due to the relatively low air pressure at higher altitudes. At particularly high altitudes, the radial loads carried by the bearing system may approach the magnitude of the thrust loads. However, this condition is undesirable because it may lead to excursion and skidding of the ball bearings within the bearing system, which may cause excessive wear within the bearing and vibration within the engine.

In addition, high-speed bearings that are supplied excess lubricant may experience an unacceptable rise in temperature due to churning losses. Ideally, a bearing is supplied enough lubricant to support the load-bearing films and carry away the frictional and mechanical heat, but not more. Too much lubricant flow in a high-speed bearing may contribute to the thermal loading of the bearing through viscous losses. Furthermore, where the lubricant is trapped in the bearing, the lubricant is heated by the shearing action of the passing balls, thereby decreasing the effectiveness and useful life of the lubricant.

Accordingly, there is a need for a light weight bearing system capable of carrying thrust loads at high altitude and of recirculating lubrication from within the bearing assembly.

BRIEF SUMMARY

According to one aspect of the present invention, a preloaded hybrid duplex bearing assembly is disclosed. A hybrid duplex ball bearing assembly includes a forward bearing, an aft bearing, and a preload spring, the preload spring disposed adjacent the aft bearing and configured to apply an axial force to push the aft bearing toward the forward bearing, where the forward bearing and aft bearing share an inner race. In at one embodiment, the axial force applied by the preload spring is about 100 pounds-force. The forward bearing and the aft bearing are angular contact bearings each including a contact angle, and the contact angles of the forward bearing and the aft bearing converge at a point within the bearing assembly. In at least one embodiment, the aft bearing is not radially loaded and carries only the axial force of the preload spring. In at least one embodiment, the forward bearing forms a radial clearance fit with the aft bearing such that the aft bearing carries no radial load.

According to another aspect of the present invention, a hybrid duplex ball bearing assembly includes an inner race including a forward portion and an aft portion, a forward outer race disposed around the forward portion of the inner race, a forward bearing cage, a plurality of forward ball bearings disposed between the forward portion of the inner race and the forward outer race and spaced apart from one another by the forward bearing cage, an aft outer race disposed around the aft portion of the inner race, an aft bearing cage, a plurality of aft ball bearings disposed between the aft portion of the inner race and the aft outer race and spaced apart from one another by the aft bearing cage, and a preload spring disposed adjacent the aft outer race, the preload spring configured to apply an axial force to the aft outer race in the direction of a forward thrust load along the shaft.

In at least one embodiment, the preload spring applies an axial force to push the aft outer race and the forward outer race toward one another. In at least one embodiment, the aft outer race and the plurality of aft ball bearings are not radially loaded. In at least one embodiment, at least a portion of the aft outer race is disposed within the forward outer race. In at least one embodiment, the forward outer race forms a clearance fit with the aft outer race such that the aft outer race carries no radial load. In at least one embodiment, the aft outer race carries only the axial force of the preload spring. In at least one embodiment, the forward outer race, the plurality of forward ball bearings, and the forward portion of the inner race form a forward contact angle, and the aft outer race, the plurality of aft ball bearings, and the aft portion of the inner race form an aft contact angle, and wherein the forward contact angle and the aft contact angle converge at a point within the bearing assembly. At least one embodiment of the bearing assembly includes an inner race that further includes an inner surface and an opposing outer surface, and a plurality of holes formed through the inner race fluidly communicating the inner surface and the outer surface, wherein the forward outer race and the aft outer race form a lubricant drain therebetween in fluid communication with the plurality of holes.

According to another aspect of the present invention, a turbine engine includes a main shaft, a bearing housing, and a duplex bearing assembly connected to the main shaft and disposed within and connected to the bearing housing, the bearing assembly including a forward angular contact bearing, an aft angular contact bearing, and a preload spring, the preload spring disposed adjacent the aft bearing and configured to apply an axial force to push the aft bearing toward the forward bearing, wherein the forward bearing and the aft bearing share an inner race. In at least one embodiment, the axial force applied by the preload spring is about 100 pounds-force. In at least one embodiment, the forward bearing and the aft bearing are angular contact bearings each including a contact angle, and wherein the contact angles of the forward bearing and the aft bearing converge at a point within the bearing assembly. In at least one embodiment, the aft bearing is not radially loaded.

According to another aspect of the present invention, a bearing lubrication system includes a forward bearing including a forward outer race disposed around a forward end of an inner race, and a plurality of forward ball bearings disposed between the inner race and the forward outer race, and an aft bearing including an aft outer race disposed around an aft end of the inner race, and a plurality of aft ball bearings disposed between the inner race and the aft outer race. In at least one embodiment, the forward bearing and aft bearing share the inner race, the inner race including an inner surface and an opposing outer surface adjacent the forward ball bearings and the aft ball bearings, and a plurality of holes fluidly communicating the inner surface and the outer surface, the forward outer race and the aft outer race form a drain therebetween in fluid communication with the plurality of holes.

DETAILED DESCRIPTION

Figure 1:
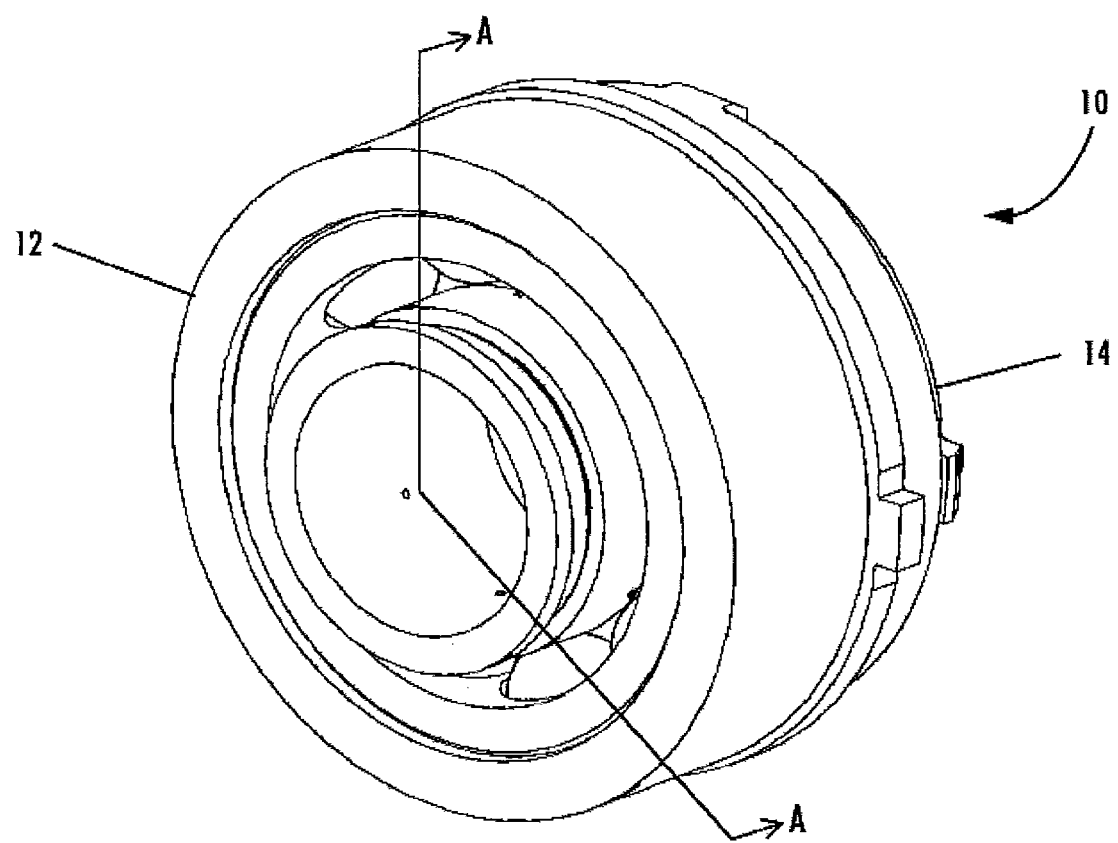
FIG. 1 shows a perspective view of an embodiment of an exemplary ball bearing assembly.

The present application discloses various bearing systems and methods for using and constructing the same. According to one aspect of the present disclosure, a preloaded hybrid duplex ball bearing assembly is disclosed. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
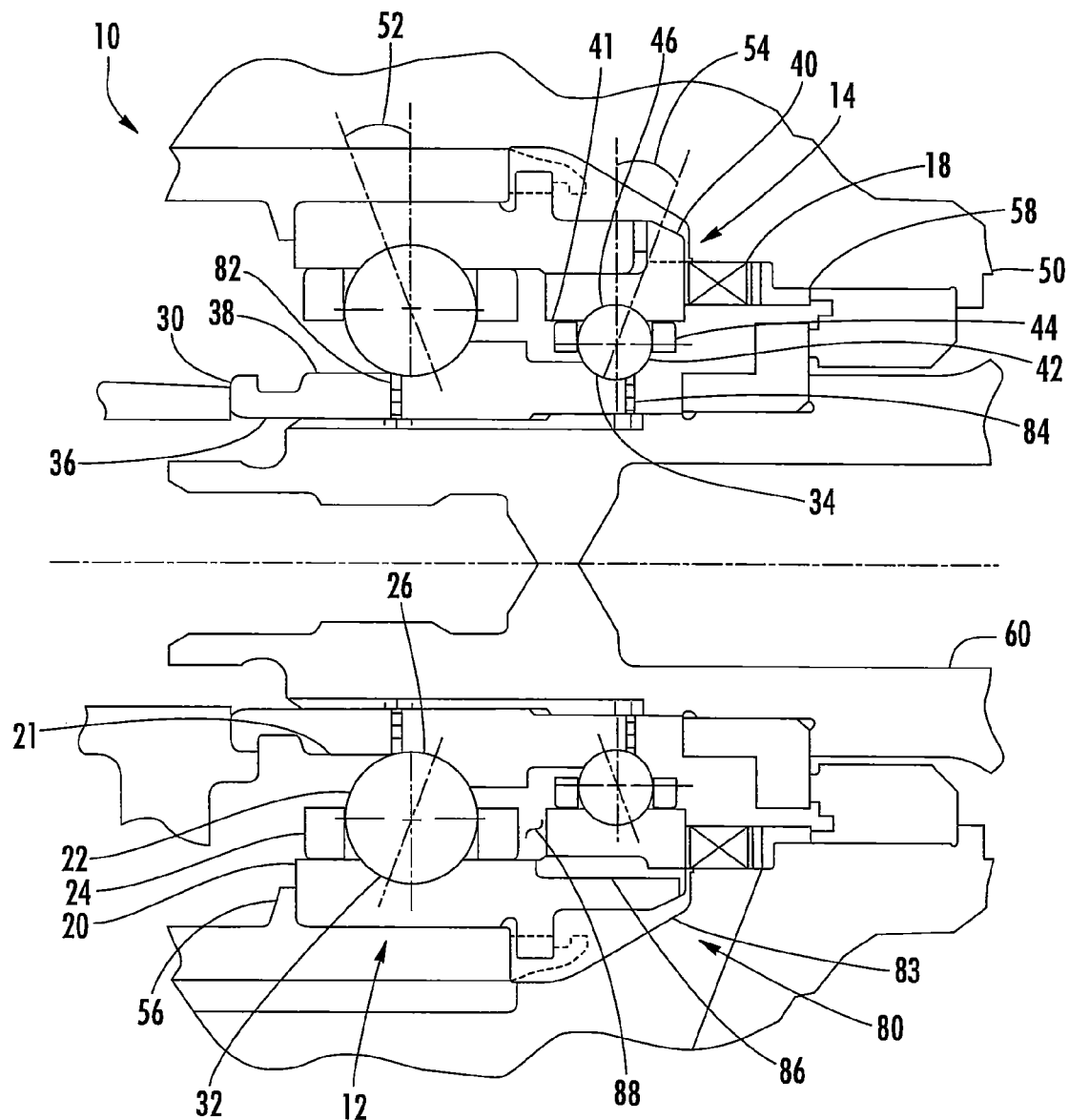
FIG. 2 shows a cross-sectional view taken at line A-A of FIG. 1 of an embodiment of an exemplary ball bearing assembly.

FIG. 1 shows a perspective view of a hybrid duplex ball bearing assembly according to at least one embodiment, and FIG. 2 shows a cross-sectional view of an exemplary hybrid duplex ball bearing assembly according to at least one embodiment. As shown in FIG. 2, a hybrid duplex ball bearing assembly 10 may include a forward bearing 12 and an aft bearing 14 preloaded against one another by a preload spring 18. The forward bearing 12 and the aft bearing 14 may share a common inner race 30, the inner race 30 including an inner surface 36 and an opposing outer surface 38. Though depicted as a single part, in at least one embodiment, the inner race 30 may comprise more than one part, for example a forward inner race and an aft inner race. As further shown in FIG. 2, the bearing system 10 may be applied to a shaft 60 within a bearing housing 50 and secured by a thrust retainer 56. The shaft 60 may be a rotating shaft subject to axial and radial loading, including but not limited to a shaft for a turbine engine, turbocharger, machine tool spindle, turbo-pump, or any similar high-speed rotational load machine.

The forward bearing 12 may further include a forward outer race 20 positioned around the inner race 30 and a plurality of forward ball bearings 22 disposed and retained between the forward outer race 20 and the inner race 30. The plurality of forward ball bearings 22 may be separated from one another by a forward cage 24. The forward outer race 20 may include a forward outer raceway 26 formed in an inner forward race surface 21 of the forward outer race 20 along which the plurality of forward ball bearings 22 may rotate and travel, where the inner forward race surface 21 faces the outer surface 38 of the inner race 30. The forward outer raceway 26 may be formed to accept axial and radial loads transferred via the plurality of forward ball bearings 22 from the inner race 30.

The aft bearing 14 may further include an aft outer race 40 positioned around the inner race 30 and a plurality of aft ball bearings 42 disposed and retained between the aft outer race 40 and the inner race 30. The plurality of aft ball bearings 42 may be separated from one another by an aft cage 44. The aft outer race 40 may include an aft outer raceway 46 formed in an inner surface 41 of the aft outer race 40 along which the plurality of aft ball bearings 42 may rotate and travel, where the inner aft race surface 41 faces the outer surface 38 of the inner race 30. The aft outer raceway 46 may be formed to accept axial and radial loads transferred via the plurality of aft ball bearings 42 from the inner race 30. The number of the forward ball bearings 22 and the aft ball bearings 42 may depend on the diameter of the balls and the dimensions of the bearing assembly 10. In at least one embodiment, the aft outer race 40 may be disposed between the inner race 30 and at least a portion of the forward outer race 20.

The outer surface 38 of the inner race 30 may include a forward inner raceway 32 formed opposite the forward outer raceway 26 to enable the plurality of forward ball bearings 22 to rotate and travel around the inner race 30 and to transfer axial and radial loads from the inner race 30 to the forward ball bearings 22. In at least one embodiment, the forward inner raceway 32 may be formed to enable angular contact between the forward inner raceway 32, the plurality of forward ball bearings 22, and the forward outer raceway 26 at a forward contact angle 52. Similarly, the outer surface 38 of the inner race 30 may include an aft inner raceway 34 formed opposite the aft outer raceway 46 to enable the plurality of aft ball bearings 42 to rotate and travel around the inner race 30 and to transfer axial and radial loads from the inner race 30 to the aft ball bearings 42. In at least one embodiment, the aft inner raceway 34 may be formed to enable angular contact between the aft inner raceway 34, the plurality of aft ball bearings 42, and the aft outer raceway 46 at an aft contact angle 54.

In at least one embodiment, the forward bearing 12 and aft bearing 14 may be angular contact bearings in a duplex face-to-face arrangement where the forward contact angle 52 and aft contact angle 54 converge at a point within the bearing assembly 10. The duplex arrangement of the forward bearing 12 and aft bearing 14 enables the forward bearing 12 and aft bearing 14 to bear opposing loads relative to one another and to share and dissipate radial and axial (i.e., thrust) loads in all directions. Moreover, the face-to-face arrangement of the forward bearing 12 and aft bearing 14 enables the forward bearing 12 and aft bearing 14 to accommodate potential misalignment of the bearing system 10 relative to the shaft 60 and to allow for a potential third bearing on the shaft 60. In particular, the face-to-face arrangement of the forward bearing 12 and the aft bearing 14 prevents the aft bearing 14 from restricting motion of the shaft 60 due to deflection or non-coaxiality between the forward bearing 12 and the potential third bearing. As a result, the duplex face-to-face arrangement of the forward bearing 12 and aft bearing 14 enables the bearing system 10 to carry a wider range and variability of thrust loads.

The inner race 30 of the bearing system 10 may be formed such that when mounted on the shaft 60 the inner race 30 forms an interference fit with shaft 60 at least at or near the forward bearing 12. Further, the forward outer race 20 may be formed to enable an interference fit with the thrust retainer 56, thereby efficiently transferring both axial and radial loads from the shaft 60 through the bearing system 10 and to bearing housing 50. Further, the forward outer race 20 may be formed to enable a clearance fit between the inner forward race surface 21 and the aft outer race 40 as shown in FIG. 2. The clearance fit between the aft bearing 14 and the forward bearing 12 ensures that the forward bearing 12 carries the radial loads of the shaft 60. In such an embodiment, the radial loads of the shaft 60 are borne by the forward bearing 12 entirely, or nearly so, under even worse case dimensional variation and misalignment of the shaft 60 to the bearing system 10. The degree of clearance between the aft bearing 14 and the remainder of the system may be determined by the operating conditions of a given application. For example, the diametral clearance between the inner forward race surface 21 and the aft outer race 40 may be about 0.003 inches (in.). In general, the bearing system 10 may be capable of maintaining significantly more axial loading as radial loading.

The bearing assembly 10 may further include the preload spring 18 positioned adjacent the aft outer race 40 and held in contact with the aft outer race 40 by a spring retainer 58. The preload spring 18 may be configured to apply a forward axial load to the aft bearing 14 in the direction of the forward bearing 12, thereby preloading the forward bearing 12 and aft bearing 14 against one another. The preload spring 18 further ensures that all elements of the forward bearing 12 and aft bearing 14 are positively loaded and that all ball bearings 22, 42 are in contact with their respective raceways 26, 32, 34, 46 regardless of the thrust load produced by the engine. In operation, preloading of the bearing system 10 ensures that the axial thrust load dominates the radial load within the bearing system 10, which reduces ball excursion and skidding. Consequently, in at least one embodiment, the aft bearing 14 serves primarily to preload the forward bearing 12 and increase capacity of the bearing system 10 to carry a range of variable thrust loads. Because the aft bearing 14 is configured to carry only the axial preload, the aft bearing 14 may be smaller than the forward bearing 12, thereby decreasing the weight and cost of the bearing system 10.

The preloaded configuration of the bearing system 10 is also beneficial under operating conditions that include low thrust loads from the shaft 60, such as when operating at high altitude. At high altitudes, the relatively low air pressure causes the engine to generate relatively low thrust to the point where radial loads may approach the axial thrust loads, which may result in ball excursion and skidding leading to excessive wear of the bearings. Under these conditions, the preloaded bearing system 10 is capable of maintaining the desired ratio of predominate thrust loading over radial loading.

In at least one embodiment, the preload spring may be loaded to a force of about 100 pounds-force (lbf). The preload spring 18 may be selected based on the design operating conditions of a target application and the design constraints of the bearing system 10, including the space available within the bearing system 10.

In at least one embodiment, the bearing system 10 may further include a lubrication system 80 to supply a lubricant, such as oil or any other natural or synthetic lubricant, to the load bearing surfaces and moving components of the bearing system 10. The lubricant may be supplied via the shaft 60 and circulated through the bearing system 10 and between the moving components. Consequently, the lubricant may reduce friction and wear of the moving components, transfer heat away from the moving components, and enable viscous damping of vibrations emanating from the shaft 60 in operation. Viscous damping is beneficial to the durability of the shaft 60 and bearing system 10, particularly because the shaft 60 may whirl, gyrate, oscillate, and the like during operation, which creates vibrations that are transferred throughout the system.

The lubrication system 80 may include a plurality of forward oil inlets 82 formed through the inner race 30 fluidly communicating the inner race surface 36 and the outer race surface 38 at or near the forward bearing 12. In at least one embodiment, each of the plurality of the forward oil inlets 82 may pass through the inner race 30 at or near an edge of the forward inner raceway 32, thereby directing lubricant directly to the plurality of forward ball bearings 22. The lubrication system 80 may include a plurality of aft oil inlets 84 formed through the inner race 30 fluidly communicating the inner race surface 36 and the outer race surface 38 at or near the aft bearing 14. In at least one embodiment, each of the plurality of the aft oil inlets 84 may pass through the inner race 30 at or near an edge of the aft inner raceway 34, thereby directing lubricant directly to the plurality of aft bearings 42. In addition, the lubrication circulation system 80 may include a number of conventional oil passageways, such as one or more conduits 83, for recirculation of the lubricant from the inlets 82, 84, through the forward and aft bearings, through a lubricant pumping system (not shown) of the lubrication system 80, and back again.

The lubrication system 80 may further include an oil drain 86 formed between the aft bearing 14 and the inner forward race surface 21 as shown in FIG. 2. The oil drain 86 fluidly connects an inter-bearing volume 88, defined by the surfaces between the forward bearing 12 and the aft bearing 14, with the remainder of the lubrication system 80. In conventional duplex ball bearings, lubricant may flow into the volume between opposing bearings and essentially become trapped there because the lubricant must flow past additional contact surfaces to rejoin the rest of the lubricant flowing through the lubrication system. While trapped, the lubricant in a conventional bearing system may be become overheated due to lack of circulation and polluted with an increasing build-up of debris and other contaminates in the lubricant. The result may be thermal breakdown of the lubricant, increased build-up of debris and other contaminates in the lubricant, increased operating temperatures of the bearings, and increased wear of the bearings.

In contrast, the oil drain 86 enables lubricant flowing into the volume 88 to rejoin the flow of lubricant through the lubrication system 80 without first flowing between additional moving components and contact surfaces. Consequently, the oil drain 86 contributes to reduced wear of the forward bearing 12, aft bearing 14, and bearing system 10 generally, as well as the shaft 60.

Regarding materials, the various components of the bearing system 10 may be made of conventional materials known in the art. In at least one embodiment, the inner race 30, forward outer race 20, and aft outer race 40 may be formed in M50 steel; the forward and aft bearing cages 24, 44 may be formed in AISI 4340 steel with silver plating; and the forward and aft ball bearings 22, 42 may be formed in a ceramic material, such as silicon nitride, with a hardness of greater than 70 HRC. Steel ball bearings may also be used in the bearing system 10. Nonetheless, ceramic materials in ball bearing applications offer such advantages over steel as: resistance to contamination and marginal lubrication conditions; no adhesive wear; reduced friction and heat generation; and densities less than half that of steel, which translate into lower weight, lower ball/cage impact forces, and lower centrifugal loading of outer raceways.

While various embodiments of a preloaded hybrid duplex ball bearing assembly and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A hybrid duplex ball bearing assembly, the bearing assembly comprising:
a forward bearing;
an aft bearing; and
a preload spring, the preload spring disposed adjacent the aft bearing and configured to apply an axial force to push the aft bearing toward the forward bearing, wherein the forward bearing and aft bearing share an inner race, wherein the aft bearing is not radially loaded.

2. The bearing assembly of claim 1, wherein the axial force applied by the preload spring is about 100 pounds-force.

3. The bearing assembly of claim 1, wherein the forward bearing and the aft bearing are angular contact bearings each including a contact angle, and wherein the contact angles of the forward bearing and the aft bearing converge at a point within the bearing assembly.

4. A hybrid duplex ball bearing assembly, the bearing assembly comprising:
a forward bearing;
an aft bearing; and
a preload spring, the preload spring disposed adjacent the aft bearing and configured to apply an axial force to push the aft bearing toward the forward bearing, wherein the forward bearing and aft bearing share an inner race, wherein the forward bearing forms a radial clearance fit with the aft bearing such that the aft bearing carries no radial load.

5. The bearing assembly of claim 4, wherein the aft bearing carries only the axial force of the preload spring.

6. The bearing assembly of claim 4, wherein the preload spring applies an axial force to push the aft outer race and the forward outer race toward one another.

7. A hybrid duplex ball bearing assembly, the bearing assembly comprising:
an inner race including a forward portion and an aft portion;
a forward outer race disposed around the forward portion of the inner race;
a forward bearing cage;
a plurality of forward ball bearings disposed between the forward portion of the inner race and the forward outer race and spaced apart from one another by the forward bearing cage;
an aft outer race disposed around the aft portion of the inner race;
an aft bearing cage;
a plurality of aft ball bearings disposed between the aft portion of the inner race and the aft outer race and spaced apart from one another by the aft bearing cage; and
a preload spring disposed adjacent the aft outer race, the preload spring configured to apply an axial force to the aft outer race in the direction of a forward thrust load along the shaft, wherein the aft outer race and the plurality of aft ball bearings are not radially loaded.

8. The bearing assembly of claim 7, wherein the preload spring applies an axial force to push the aft outer race and the forward outer race toward one another.

9. The bearing assembly of claim 8, wherein the axial force applied by the preload spring is about 100 pounds-force.

10. The bearing assembly of claim 7, wherein:
the forward outer race, the plurality of forward ball bearings, and the forward portion of the inner race form a forward contact angle, and
the aft outer race, the plurality of aft ball bearings, and the aft portion of the inner race form an aft contact angle, and
wherein the forward contact angle and the aft contact angle converge at a point within the bearing assembly.

11. The bearing assembly of claim 10, wherein the preload spring applies an axial force to push the aft outer race and the forward outer race toward one another.

12. A hybrid duplex ball bearing assembly, the bearing assembly comprising:
an inner race including a forward portion and an aft portion;
a forward outer race disposed around the forward portion of the inner race;
a forward bearing cage;
a plurality of forward ball bearings disposed between the forward portion of the inner race and the forward outer race and spaced apart from one another by the forward bearing cage;
an aft outer race disposed around the aft portion of the inner race;
an aft bearing cage;
a plurality of aft ball bearings disposed between the aft portion of the inner race and the aft outer race and spaced apart from one another by the aft bearing cage; and
a preload spring disposed adjacent the aft outer race, the preload spring configured to apply an axial force to the aft outer race in the direction of a forward thrust load along the shaft, wherein at least a portion of the aft outer race is disposed within the forward outer race.

13. The bearing assembly of claim 12, wherein the preload spring applies an axial force to push the aft outer race and the forward outer race toward one another.

14. A hybrid duplex ball bearing assembly, the bearing assembly comprising:
an inner race including a forward portion and an aft portion;
a forward outer race disposed around the forward portion of the inner race;

a forward bearing cage;
a plurality of forward ball bearings disposed between the forward portion of the inner race and the forward outer race and spaced apart from one another by the forward bearing cage;
an aft outer race disposed around the aft portion of the inner race;
an aft bearing cage;
a plurality of aft ball bearings disposed between the aft portion of the inner race and the aft outer race and spaced apart from one another by the aft bearing cage; and
a preload spring disposed adjacent the aft outer race, the preload spring configured to apply an axial force to the aft outer race in the direction of a forward thrust load along the shaft, wherein the forward outer race forms a clearance fit with the aft outer race such that the aft outer race carries no radial load.

15. The bearing assembly of claim 14, wherein the aft outer race carries only the axial force of the preload spring.

16. A hybrid duplex ball bearing assembly, the bearing assembly comprising:
an inner race including a forward portion and an aft portion;
a forward outer race disposed around the forward portion of the inner race;
a forward bearing cage;
a plurality of forward ball bearings disposed between the forward portion of the inner race and the forward outer race and spaced apart from one another by the forward bearing cage;
an aft outer race disposed around the aft portion of the inner race;
an aft bearing cage;
a plurality of aft ball bearings disposed between the aft portion of the inner race and the aft outer race and spaced apart from one another by the aft bearing cage; and
a preload spring disposed adjacent the aft outer race, the preload spring configured to apply an axial force to the aft outer race in the direction of a forward thrust load along the shaft, wherein the inner race further comprises:
an inner surface and an opposing outer surface; and
a plurality of holes formed through the inner race fluidly communicating the inner surface and the outer surface, wherein the forward outer race and the aft outer race form a lubricant drain therebetween in fluid communication with the plurality of holes.

17. The bearing assembly of claim 16, wherein the preload spring applies an axial force to push the aft outer race and the forward outer race toward one another.

18. A turbine engine, the turbine engine comprising:
a main shaft;
a bearing housing; and
a duplex bearing assembly connected to the main shaft and disposed within and connected to the bearing housing, the bearing assembly comprising:
a forward angular contact bearing;
an aft angular contact bearing; and
a preload spring, the preload spring disposed adjacent the aft bearing and configured to apply an axial force to push the aft bearing toward the forward bearing, wherein the forward bearing and the aft bearing share an inner race, wherein the aft bearing is not radially loaded.

19. The turbine engine of claim 18, wherein the axial force applied by the preload spring is about 100 pounds-force.

20. The turbine engine of claim 18, wherein the forward bearing and the aft bearing are angular contact bearings each including a contact angle, and wherein the contact angles of the forward bearing and the aft bearing converge at a point within the bearing assembly.

* * * * *